United States Patent [19]

Buchholtzer et al.

[11] 4,001,511
[45] Jan. 4, 1977

[54] CHANNEL BOARD FOR TELEPHONY TRANSMISSION EQUIPMENT USING SINGLE SIDE BAND MULTIPLEXING

[75] Inventors: Claude Buchholtzer; Pierre Deman; Michel Drobecq; Pierre Oger, all of Paris, France

[73] Assignee: Thomson-CSF, Paris, France

[22] Filed: Aug. 27, 1975

[21] Appl. No.: 608,241

[30] Foreign Application Priority Data

Sept. 3, 1974 France .............................. 74.29954

[52] U.S. Cl. .......................................... 179/15 FS
[51] Int. Cl.² ........................................ H04J 1/08
[58] Field of Search .................. 179/15 FS, 15 FD; 325/49, 50

[56] References Cited
UNITED STATES PATENTS 3,505,479  4/1970  Hodge ............................. 179/15 FS

FOREIGN PATENTS OR APPLICATIONS 2,125,654  2/1972  Germany ....................... 179/15 FD

OTHER PUBLICATIONS

Johansen, "Transmission of Sound Programmes on Carrier Systems for Telephony," Ericsson Review, vol. 47, No. 2, 1970, pp. 64–72.

*Primary Examiner*—Kathleen H. Claffy
*Assistant Examiner*—Joseph Popek
*Attorney, Agent, or Firm*—Cushman, Darby, & Cushman

[57] ABSTRACT

A channel board which simplifies wiring.

Each channel board 30–31 comprises its own controlled carrier current generator for the formation of primary groups, and preferably also for the direct formation of the secondary groups from pre-modulated channels. The requisite carrier current is obtained by controlling the value of the divisor N in the frequency divider contained in the feedback loop. The control of N is effected for example simply by inserting the channel board into its location or by providing in addition with a selector plug, or by means of loaded shift registers.

11 Claims, 6 Drawing Figures

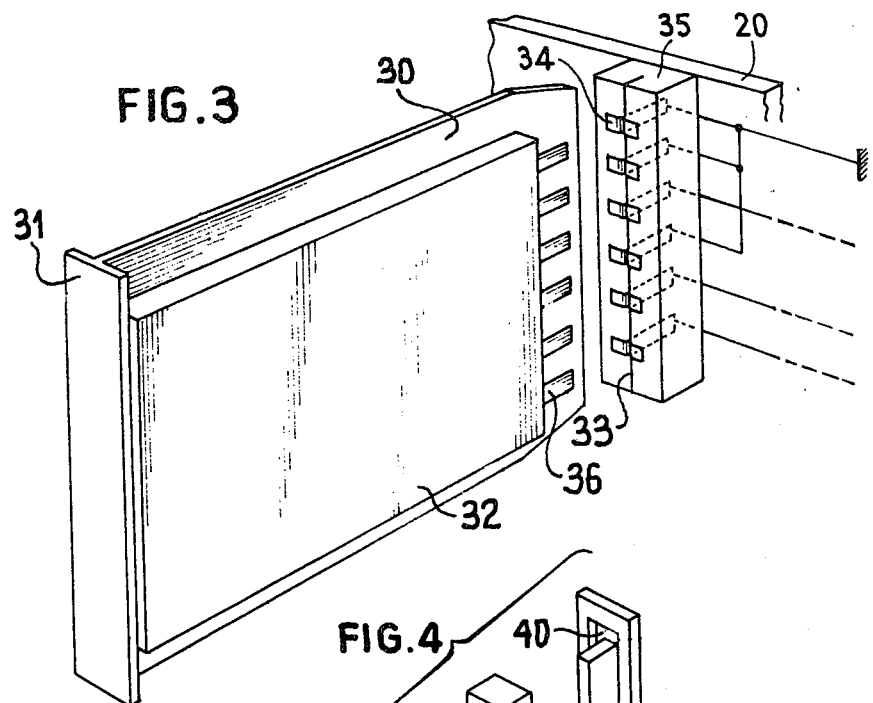
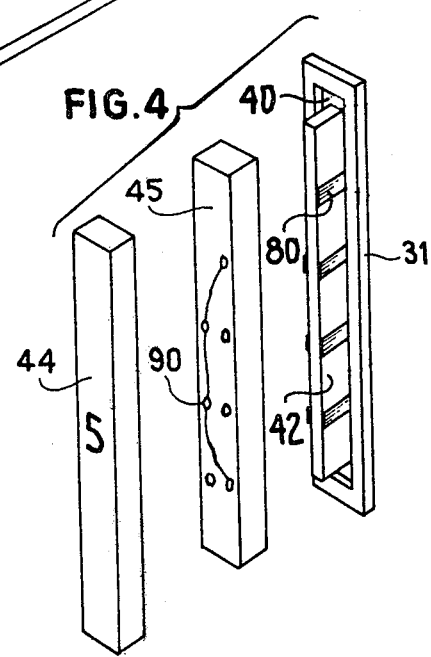
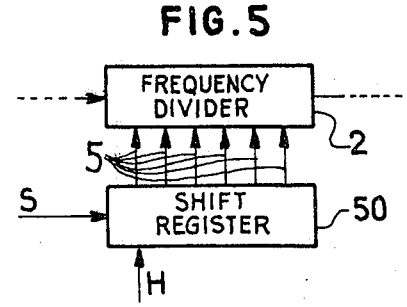

CHANNEL BOARD FOR TELEPHONY TRANSMISSION EQUIPMENT USING SINGLE SIDE BAND MULTIPLEXING

The present invention relates to an improvement in the channel boards used for telephony transmission equipment using single side-band multiplexing and the premodulation technique.

The invention likewise relates to arrangements utilising such boards.

A channel board of the aforesaid type comprises a first modulator, effecting a frequency translation, referred to as premodulation, which is the same for all the channels, and a second modulator for translating the premodulated channels, as well as the two corresponding demodulators. In known art, the second modulator is only used for building up a primary group also called a basic group.

At the current time, in order to supply the carrier currents to the second modulator and to the corresponding demodulator, generators are used, often of the harmonic selection type, which serve a set of channel boards.

This has several drawbacks:

It requires the use of wiring systems which are the more complex and expensive the more it is necessary to avoid any substantial cross-talk between the various carrier currents.

Since these wiring arrangements are fixed, the distribution of channels in the spectrum of the multiplex signal, is fixed once and for all.

It has already been proposed to use for generating the different values of the carrier frequencies, generators of the phase-lock loop type, comprising a loop with a fixed frequency divider and a phase comparator receiving a reference frequency.

In a patent application filed in the Federal Republic of Germany, Offenlegungsschrift No. 2,125,654, the use of such generators is described for obtaining the carrier frequencies which are necessary for building up a primary group of 12 channels. Either a total of 12 generators is used for supplying all the channel boards with the 12 carrier frequencies, or a lesser number of generators may be used, for example six, the oscillator of each of which is controlled for oscillating on a multiple of two carrier frequencies, the latter being derived from the oscillator by means of two further fixed frequency dividers.

In an article "Carrier Supply Using Phase-Locked Loops for Higher-Order Frequency Division Multiplex Systems", published in the review "Nachrichtentechnische Zeitschrift N.T.Z.", 1972, No. 11, page 523 to 527, a system is described which uses a generator of the aforesaid type for each carrier frequency necessary for building up the primary and the supergroups.

In this article, as well as in a patent application filed in the Federal Republic of Germany, Offenlegungsschrift No. 2,143,075, it is proposed to go further as concerns the carrier frequencies necessary for building up the mastergroups and master supergroups and to assign to each modem (i.e. modulator and corresponding demodulator) its own carrier generator, combined in a single unit with the modem.

The reason given in this article is that at such high freqeuncies the equipment required for the changeover facilities (in case of failure of a carrier generator) and the multiple connection of the carriers can no longer be neglected with respect to the carrier provising equipment proper.

The applicants have found that the measure proposed for higher order groups can advantageously be used for the second modulation, following a premodulation, provided the carrier generator be a variable frequency generator, the frequency of which is controlled by controlling the value N of the divisor of the division effected in the loop.

The resulting flexibility of the transmission equipement using such boards, as will be seen hereinafter, as well as the fact that a mass production of the channel boards, if the measure is applied on a large scale, will reduce the cost of those boards, will finally render advantageous the multiplication of the number of the carrier generators.

The invention will be better understood and other of its features rendered apparent from a consideration of the ensuing description and the related drawings in which:

FIGS. 3, 4 and 5 illustrate three methods of controlling the value of the variable divisor of the frequency divider of the frequency generator.

The invention will first of all be described by way of non-limitative example in the context of the multiplexing system generally employed in France at the present time, only those elements which are relevant to the invention having actually been dealt with.

Each input channel of the multiplexer, which is assigned a band extending from 0 to 4 kHz (however, within this band, only the voice components between 0.3 and 3.4 kHz are actually transmitted), first of all undergoes an additive translation by single side-band modulation, this being known as pre-modulation, involving a 24 kHz carrier current. (A kHz meaning 1,000 cycles per second.)

The thus translated channels in the same band extending from 24 to 28 kHz, are subjected to separate subtrative translations, known here as the second modulation, in order to form a primary group of 12 channels covering the band from 60 to 108 kHz, the carrier frequencies utilised ranging from 88 to 132 kHz in steps of 4 kHz.

The primary groups are then utilised to form "secondary groups" supergroups of 60 channels comprising 5 primary or basic groups each and covering the band from 312 to 552 kHz. The third modulation operations are subtractive translation utilising 5 carrier frequencies ranging from 420 to 612 kHz in steps of 48 kHz.

The reverse operations are of course performed at the receiving end.

Physically, each channel to be multiplexed in one direction and demultiplexed in the other, is assigned a channel board or "card" or "plug-in unit".

This channel board comprises a support with premodulation and second modulation circuits, plus the corresponding demodulation circuits and coupling circuits, these circuits being carried by the support itself. The support generally has a front face which is perpendicular to the part carrying the circuits.

These boards are arranged vertically and plugged into shelves, the plugging in of the boards establishing the requisite connections.

Figure 1:
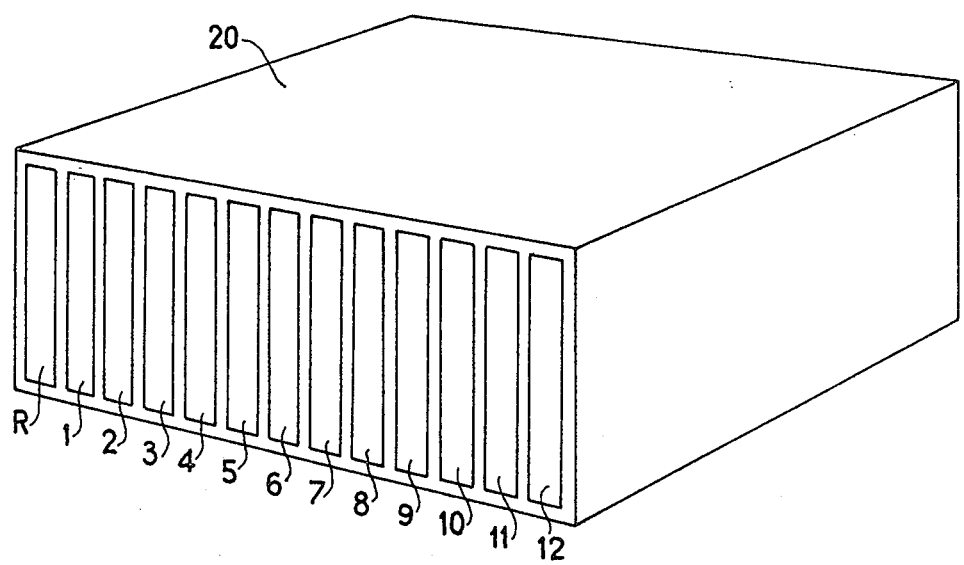
FIG. 1 illustrates a perspective view of a shelf containing channel boards.

A primary group shelf 20, accommodates for example 12 channel boards 1 to 12 and a grouping board R as indicated schematically in FIG. 1. The boards are plugged into corresponding locations and the connections between channel boards and grouping board, only the edges of these boards being visible, are effected by connections at the back of the shelf and not visible in the figure.

In known art, a carrier current generator outside the primary group shelves, distributes the pre-modulation frequency and the second modulation frequencies to the channel boards of a shelf assembly.

In accordance with the invention, each channel board is associated with a frequency generator designed to supply it with all the carrier frequencies required for the formation of a primary group. This association is effected quite simply by utilising the channel board to carry the generator as well.

Figure 2:
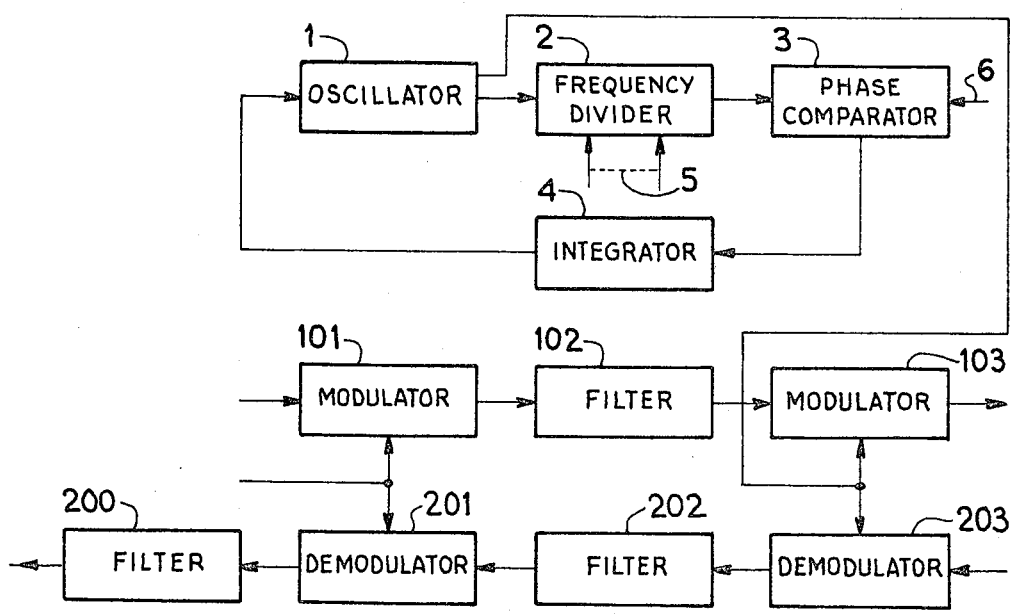
FIG. 2 illustrates an embodiment of the frequency-generator associated with each channel board.

FIG. 2 illustrates a conventional embodiment of this kind of generator, with the modulators and demodulators of the channel board.

In FIG. 2, there has been shown only these elements of the circuits of a channel board which are necessary for understanding the invention. The modulating branch of the channel board includes in series a premodulation modulator 101, followed by a filter 102 and a second modulator 103. The demodulating branch includes an input demodulator 203 followed by a filter 202, and a premodulation demodulator 201, followed by a filter 200. Modulator 101 and demodulator 201 receive a fixed frequency on their carrier inputs. In known art, modulator 103 and demodulator 203 receive from an external carrier generator a carrier frequency which is a function of the position number which the output signal from modulator 103 is to occupy in a primary group. Elimination of the undesired side band after second modulation is effected after the addition of the output signals from 12 modulators such as 103.

The frequency generator comprises an oscillator 1 supplying a squarewave, followed by a frequency divider of variable divisor N, a phase comparator 3 supplied on the other hand at its input 6 with a reference frequency, and an integrator 4 whose output is connected to the frequency control input of the oscillator.

As those skilled in the art will realise, a circuit of this kind makes it possible to control the oscillation in accordance with the frequency $N.F_r$, $F_r$ being the reference frequency. The divider is constituted by a cycle counter delivering a signal each time it has counted N pulses, and a device electronically controlling the value of the divisor N.

The devider therefore comprises a set of control inputs 5.

In order to obtain the 12 primary modulation frequencies, using a reference frequency of 4 kHz, N must be capable of varying from 22 to 33 and this is something which can be done using a counter with 6 binary stages.

Binary encoded display of the number N itself will require six control wires. This number can however be reduced by using a preloading counter in the frequency divider.

The devices for effecting control of the value of the divisor, which will be described hereinafter, are not tied to a given number of control wires. It has been assumed in the description that there are in fact 6.

A first embodiment consists in arranging the channel boards in the shelf as a function of the modulation frequency. The locations of position number $i$, $i = 1, 2 \ldots 12$, are responsible for determining selection of the frequency $F_i = N_i F_r$ through connections at the back of the shelf.

FIG. 3 illustrates this method of control of the value of the divisor.

In FIG. 3, there can be seen the support 30 of the channel board, showing the front face thereof, the circuits being assumed to be covered by screening 32. Only the inputs of the circuits for controlling the value of the number N (inputs 5 in FIG. 2), have actually been shown; the connection to this end between the printed circuit board 30 and the back wiring of the shelf, is effected by the known method; reinforced metallised areas on the printed board, such as those 36, are brought into contact, by introduction of the board into the groove 33 of a connector 35, with springs such as those 34 soldered or wrapped to the back wiring of the shelf 20.

As those skilled in the art will be aware, each channel board comprises, after plugging into a shelf, a live terminal to which all the divisor control inputs can be permanently connected across resistors. The simple grounding of certain of these inputs then makes it possible to differentiate the digits 1 and 0.

Channel coding is effected in respect of each location, by grounding certain of the spring contacts as shown.

However, this makes it necessary to change the connection of the circuits if, for one reason or another, it is desired to modify the position of the channel in the multiplexed spectrum, for example in order to change its final destination in the network.

It is therefore more convenient to provide a device which makes it possible to select $F_i$ without displacing the channel board.

To this end, the channel board itself is used, preferably indeed its front face, in order to plug in there a selector plug which determines the connections which fix the number $N_i$. The 12 selector plugs carry an indication of the number $N_i$ or more simply of $F_i$ or again $i$. This kind of design has been shown in FIG. 4.

In FIG. 4, only the front face 31 of the channel board has been shown, an opening 40 being formed at the centre of this face. In this opening a set of re-inforced metallised areas similar to those described in FIG. 3 is provided, for connection to the back wiring of the shelf. Seven contacts are used. Only four contacts, such as those 80, located on the right-hand side face of the printed circuit 40 and located in the opening 40, are visible in the figure, the three other ones being located upon the left-hand side face. Six contacts are connected to the six inputs 5 (FIG. 2) and the last one is grounded.

These contacts 80 are used to ground certain control inputs in the following manner.

With each channel board there can be associated one or the other of 12 selector plugs.

In FIG. 4, the selector plug corresponding to channel 5 has been shown. The plug has been shown in the exploded state; it comprises a cover 44 and a connecting piece 45. The piece 45 is constituted by a small connector of a type similar to that used to effect contacts at the back of the shelf, the number of springs being limited to the seven (6+1) spring strips which are required.

These seven spring strips terminate in seven terminals 90, accessible at the front face of the piece 45.

By means of wire which are soldered or wrap-connected to the terminals 90, certain of the six divisor control inputs can therefore be grounded.

The cover 44 of the selector plug comprises a numerical indication (5 in the figure) of the position number of the channel corresponding to the wiring effected by means of the strips.

A third embodiment of the divisor control device consists in associating with the inputs 5 (FIG. 2) a six-stage shift-register 50 incorporated into the channel board, the outputs of said six stages being connected to the inputs 5 as shown in FIG. 5, in the latter once again the divider 2 of FIG. 2 having been shown. The register 50 comprises a clock input H and a signal input S. Divisor control is then effected by loading the register with the bits which code the number N. The input S and the input H constitute two inputs of the channel board; the corresponding contact springs of the connector at the back of the shelf are connected for example to a remote control console from which the appropriate signals prerecorded there are recorded in the register 50 by the transmission of six clock pulses and the six significant bits.

The inputs S and H can also be connected to a data-processing unit, through the appropriate inter-face.

Possible cross-talk phenomena due to the corresponding wiring arrangements, have no unwanted effects since pulses only appear during the brief amount of time required for recording.

The arrangement described makes it possible to make do with distributing to the channel boards only the premodulation frequency and the 4 kHz reference frequency, these two frequencies being the same for all the channel boards so that a considerable wiring simplification is achieved.

It is also possible, if preferred, to produce the reference frequency on the channel board by dividing the premodulation frequency.

As those skilled in the art will understand, the primary groups are used to form secondary or super-groups which in the system considered by way of example comprise 60 channels each, each occupying the band extending from 312 to 552 kHz.

It should be pointed out that at the present date, numbers of channels form supergroups which are designed for integral transmission from the centre where they have been build up from elementary channels via the primary groups, to another centre where they are broken down into elementary channels via the primary groups. This would for example be the case with the traffic between Paris and Lyons. In this case, the building up of the primary groups is an intermediate operation which is of no utility of itself and which is only maintained due to the complexity which would arise from any differentiation in the proceedure. This is not the case with the channel boards in accordance with the invention.

It is an easy matter, in other words, to utilise the same channel boards for two different purposes, some of them being intended for modulation by insertion in a primary group and others for "resultant" modulation which changes then directly from the pre-modulation stage to modulation within the body of a secondary group.

To choose the premodulation frequency without any precaution, in particular to choose too low a frequency, could give rise to the need for filtering precautions of known kind in the couplers, in order to eliminate parasitic beat frequencies due to the frequency changes.

Moreover, a high ratio between the extreme frequencies to be generated, leads to complication in the generator if correct operation is to be achieved.

However, these problems no longer arise if the premodulation frequency is chosen to be high. This solution is possible due to the existence of crystal filters suitable for channel filtering.

By utilising for example a premodulation frequency of 2500 kHz, and a crystal filter whose band covers 2500 to 2504 kHz, the second modulation operations designed to produce the primary groups, can be arranged to have carrier frequencies of $1500 + 64 = 2564$ kHz to $2500 + 108 = 2608$ kHz.

To utilise the second modulation operation to directly obtain translation within secondary groups, the modulating frequencies will range from $2500 - 548 = 1952$ kHz to $2500 - 312 = 2188$ kHz.

The frequency control generator must therefore cover on the one hand frequencies in the range from 1952 to 2188 kHz and on the other hand frequencies from 2564 to 2608 kHz, or in other words a maximum range of 1952 to 2608 kHz something which is easily attainable with a single oscillator.

The values of N required to form the primary groups, will vary from 641 to 652 and those required to form secondary groups from 488 to 547.

As indicated earlier, in accordance with a prior art the divisor N can be displayed in a manner other than by the coding of the number itself in binary code.

Preloading counters exist each stage of which comprises an independent preloading signal input supplied with an input digit which is only recorded when a pulse is applied to the preloading control input of the counter.

This makes it possible, in performing division by $x$, to display a number $y - x$ at the preloading signal inputs of the stages of the counter, and to decode the number $y$, this decoding giving rise to the appearance of a pulse which is applied to the preloading control input.

In the present instance, if $p(p = 1, 2 \ldots 12)$ is the position number of a channel in a primary group, the corresponding number N can be written as $N = 653 - p$.

Similarly, if $q(q \ 31 \ 1, 2 \ldots 60)$ is the position number of a channel in the secondary group, the corresponding number can be written as $N - 548 - q$.

Utilising a preloading counter with decoders for the counts 548 and 653, this simply requires one control wire which makes it possible to enable or to inhibit the operation of the first of these (because if it is operating, the second will never have the opportunity to operate), plus six other wires making it possible to preload the counter with a number varying between 1 and 60.

Rather than this embodiment with a minimum number of control wires, one may be preferred which on the one hand corresponds more closely to the sort of thing telephonists are used to, these latter not normally being used to numbering the channels of a secondary group from 1 to 60, and which on the other hand opens the way to various interesting possibilities through a general control over the formation of primary and secondary groups.

Figure 6:
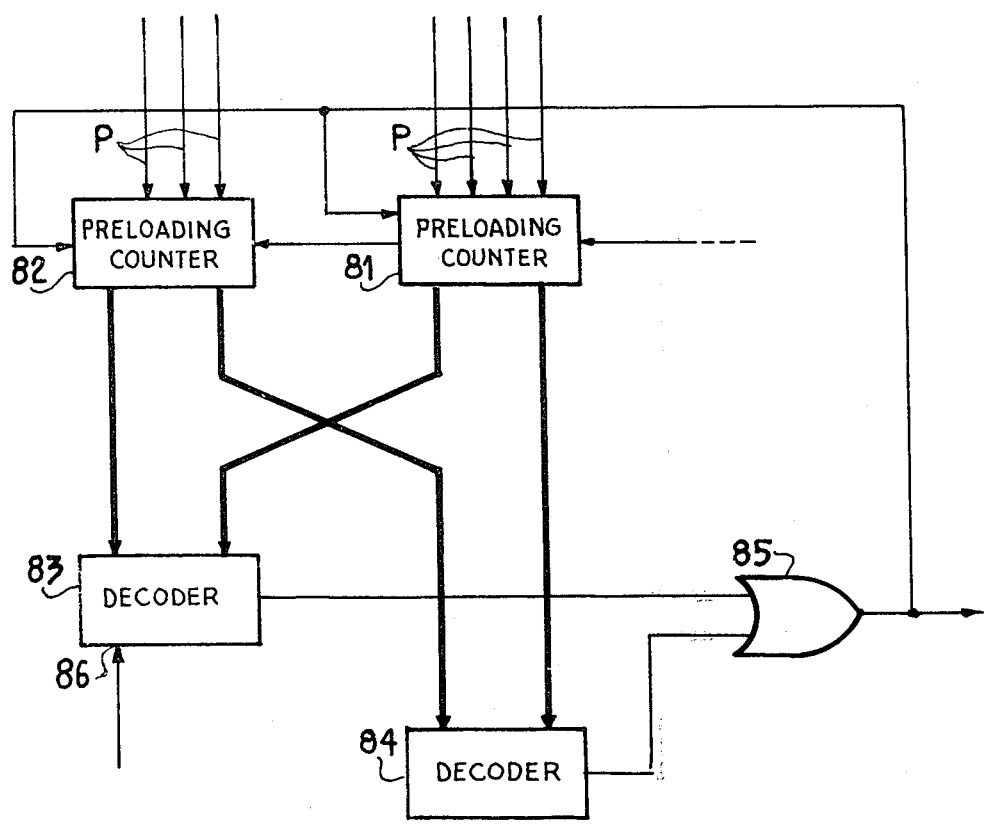
FIG. 6 illustrates a variable divider.

As embodiment of this variant form of the frequency divider has been shown in FIG. 6. As before, the counter is of the preloading kind, and it has been assumed by way of non-limitative example that it operates in binary code, $p$ ($p = 1, 2 \ldots 12$) and $q$ ($q = 1, 2 \ldots 60$) having the same significances as before and $s$ ($s = 1, 2 \ldots 5$) designating the position number of the primary group in a secondary group.

Considering a telephony channel translated into a secondary group, we obviously have the relationship $$q = (s - 1).12 + p$$

which we can write $$(q - 1) = (s-1).12 + (p - 1)$$

A divisor N intended for the formation of a primary group can be written $652 - (p - 1)$ and a divisor $N$ for the formation of a secondary group can be written $547 - (q - 1)$.

This being the case, in FIG. 6 the counter of the divider comprises two series counters 81 and 82 the first 81 of which is a modulo 12 counter and the second a modulo 64 counter. Two decoders 83 and 84 for the numbers 547 and 652 are supplied through the multiple leads (symbolised by a thicker line than the single connections) from the counters 81 and 82. The outputs of these two decoders are connected to the inputs of an OR-gate 85 whose output, constituting the output of the frequency divider, is on the other hand connected to the preloading control input of the counters 81 and 82. The decoder 83 furthermore comprises an enabling input 86 constituting one of the control wires for controlling the value of the division. Four other control wires are constituted by the preloading signal inputs P of the stages of the modulo 12 counter and the preloading signal inputs P of the first three stages of the modulo 64 counter whose preloading signal inputs, not shown, are prewired to give "0".

This being the case, to obtain a divisor corresponding to a translation into a primary group, the decoder of the number 547 is not enabled and $(p - 1)$ is displayed at the independent inputs of the modulo 12 counter, the preloading of the modulo 64 counter being zero.

To obtain a divisor corresponding to direct translation of a premodulated channel into the secondary group, $(p - 1)$ is displayed at the independent inputs of the modulo 12 counter and $(s - 1)$ at the three independent inputs of the first three stages of the modulo 64 counter, the operation of the decoder 83 being enabled.

It will be seen therefore that the system for controlling the display of N, can thus be constituted by two independent devices which we will assume for example to be two shift-registers. One register then determines the position number $p$ of the channel within a primary group, whether the latter does or does not form part of a secondary group created directly from premodulated channels. This first register only has to supply the four control wires of the modulo 12 counter.

To form a primary group the second register does not enable the decoder 83 and displays 0 on the three inputs P of the counter 82.

To form a secondary group, it enables the decoder 82 and displays "$s - 1$" at the inputs P of the counter 82.

This is only an example and the two devices could each for example be one of the types illustrated in FIGS. 3, 4 and 5, and in fact be two different types.

However, some remarks should be made in respect of the selector plugs, including "first plugs" determining $p$ and "second plugs" determining $s$.

First of all in each category the first plug, determining the position number $p$ in a primary group should preferably be numbered $p$ although it is used to display $(p - 1)$ the same applies for the second plug determining $s$ through causing the display of $(s - 1)$.

It will be possible to provide a particular "second plug" when it is desired to form a primary group. It is not essential if the connections established in the absence of the "second plug" correspond to the inhibition of the counter 547 and to the displaying of 0 at the inputs P of the counter 83. Although it is not indispensable, it may be replaced by a simple signalling plug numbered 0.

If the display at the independent inputs of the counter 82 in the absence of a plug corresponds to "1" digits (this is the case if the 0 corresponds to ground potential and if control is effected by grounding certain wires, in the manner indicated earlier) the control inputs of the counter 83 can be provided with bit inversers if the first plugs are not to act upon them.

It will be observed that the second modulation could be used to form groups of a higher order than the secondary groups.

Of course, the invention is not limited to the embodiments described and shown which were given solely by way of example.

What is claimed is:

1. A channel board for a telephony transmission equipment using single side band multiplexing for forming groups, including primary groups, of telephone channels, said channel board comprising a support and on this support: a modulating branch for frequency translating a voice frequency channel and a demodulating branch for translating again to voice frequency a previously frequency translated telephone channel, said modulating branch including in series a premodulation modulator, a filter, and a second modulator, said demodulating branch including in series an input demodulator, a filter and a further demodulator; and a frequency generator for selectively delivering at least all the carrier currents necessary for translating a premodulated telephone channel into any desired position in a primary group, said frequency generator being of the phase locked loop type, including an oscillator having a control input and a circuit having an input coupled for receiving the wave generated by said oscillator and an output connected to said control input of said oscillator, said circuit including a variable frequency divider for dividing the frequency of said wave, said frequency divider having control inputs for controlling the value N of the divisor of the division effected by said frequency divider and an output, and a phase comparator having a first input coupled to the output of said frequency divider and a second input for receiving a reference frequency, for comparing the phases of the output signal from said frequency divider and of said reference frequency; said premodulation modulator and said further demodulator having respective carrier inputs for receiving a signal at a fixed frequency, said second modulator and input demodulator having respective carrier inputs coupled for receiving said wave.

2. A channel board as claimed in claim 1, wherein the values of N which can be controlled make it possible to derive from said oscillator the carrier currents required for the formation of standard primary groups of a multiplexing system as well as for the formation, directly from the premodulated channels, of standard secondary groups.

3. A channel board as claimed in claim 2, for a transmission equipment using standard primary groups comprising 12 channels and standard secondary groups comprising five primary groups, wherein said frequency divider comprises a counter, referred to as a full counter, formed by an input preloading counter and an output preloading counter connected in series; said input counter being a modulo 12 counter, having a preloading control input and preloading signal inputs for imparting thereto 12 different counts; said output counter having a preloading control input and preloading signal inputs for imparting thereto at least five different counts; said frequency divider further comprising a first decoder for decoding a predetermined count of said full counter, and a second decoder for decoding a second predetermined count of said full counter, greater than said first predetermined count; said first decoder having a control input for receiving a signal allowing or inhibiting its operation, and said two decoders having respective outputs each coupled to said preloading control inputs of said input counter; said frequency divider control inputs comprising said preloading signal inputs of said input and output counters and said control input of said first decoder, the signal applied to said control input of said first decoder and the signals applied to said preloading signal inputs of said input counter determining the position number of a channel in a primary group, and the signal applied to said control input of said first decoder and the signals applied to said preloading signal inputs of said output counter determining the position number of this primary group in a secondary group when said second modulation is used for directly translating a premodulated channel into a secondary group.

4. A channel board as claimed in claim 1, wherein at least part of said control inputs of said frequency divider are provided with contact elements adapted for cooperating with complementary contact elements provided in the shelf locations designed to receive channel boards, for the establishment of electrical connections determining at least in part said value N.

5. A channel board as claimed in claim 1, wherein at least part of the control inputs of said frequency divider are equipped with contact elements adapted for cooperating with complementary contact elements carried by several categories of detachable selector plugs, each of said plugs establishing electrical connections determining at least in part said value N.

6. A channel board as claimed in claim 1, further comprising, on said support, a shift-register having stages respectively connected to at least part of said control inputs of said frequencies divider, said shift register having a clock input and a signal input forming two inputs of the channel board.

7. A channel board as claimed in claim 3, further comprising on said support first and second shift-registers having respective clock inputs, respective signal inputs, and respective stages, said each of said control inputs of said frequency divider being connected to a respective one of said stages of said first and second shift-registers, whereby all of said preloading signal inputs of said input counter are connected a respective one of said stages of said first shift register, and all of said preloading signal inputs of said output counter are connected to a respective one of said stages of said second shift register.

8. A telephony multiplexing and demultiplexing arrangement comprising channel boards as claimed in claim 4, and shelves having different locations intended for channel boards, said shelves comprising contact elements which are the complements of the contact elements of said channel boards, for controlling at least in part the said value N for a channel board, when said latter is inserted into a location.

9. A telephony multiplexing and demultiplexing arrangement comprising channel boards as claimed in claim 5, and a set of different categories of selector plugs which can be temporarily attached to said channel board for controlling at least in part said value N.

10. A telephony multiplexing and demultiplexing arrangement comprising channel boards as claimed in claim 6, and means for loading said shift register.

11. A telephony multiplexing and demultiplexing arrangement comprising channel boards as claimed in claim 7, and means for loading said shift registers.

* * * * *